April 30, 1963   W. J. PHILLIPS, SR   3,087,298
ROTARY MOWER BLADE
Filed Aug. 19, 1960
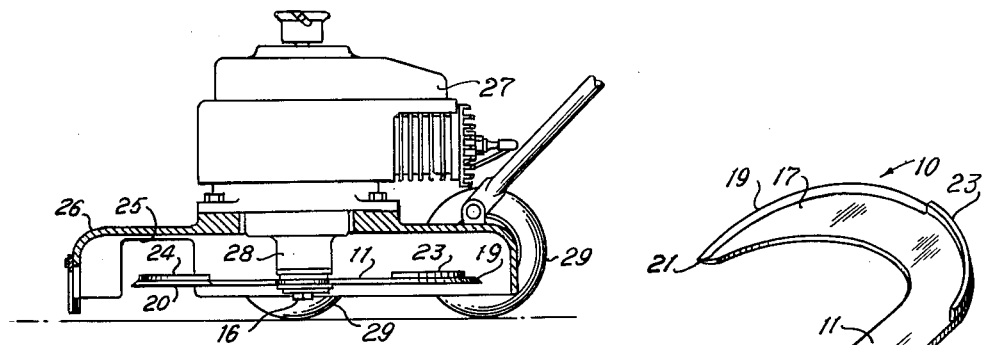
Fig. 1
Fig. 3
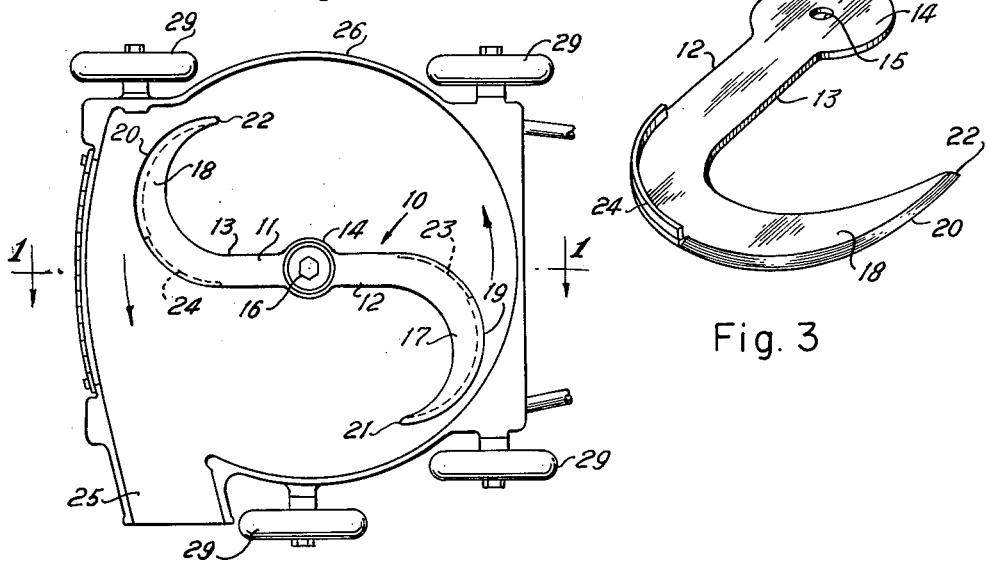
Fig. 2
Fig. 5
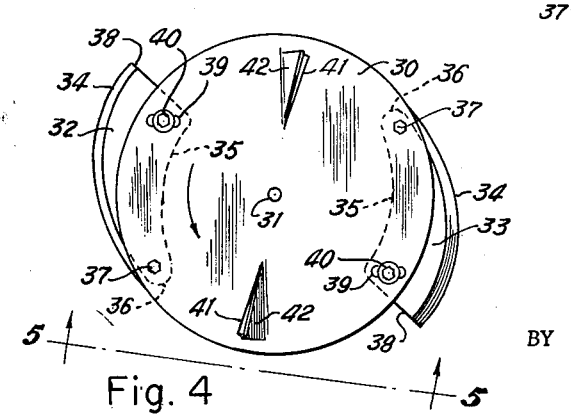
Fig. 4
INVENTOR
Walter J. Phillips, Sr.
BY
ATTORNEY

United States Patent Office 3,087,298
Patented Apr. 30, 1963

3,087,298
ROTARY MOWER BLADE
Walter J. Phillips, Sr., 2103 Hudspeth St., Dallas 16, Tex.
Filed Aug. 19, 1960, Ser. No. 50,611
2 Claims. (Cl. 56—295)

This invention relates to rotary mowing blades, and it has particular reference to an improved blade for rotary type lawn mowers, the principal object of the invention residing in the provision of a blade whose cutting edges are arcuate and adapted to engage the vegetation to be cut in a slicing action in a circular path rather than a hacking or chopping action characteristic of the straight blades in common use on rotary type mowers.

Another object of the invention is that of providing a rotary mowing blade which, while designed primarily for lawn mowers, is capable of efficient and safe operation on the larger rotary type mowers powered by tractors and used in agriculture, park and highway right of way maintenance, and the like, and is particularly adapted for use in rough terrain, and in areas where rocks, metal articles, and other hard objects are encountered which, when struck by a conventional type straight blade, becomes a dangerous missile and a hazard to life and property.

A still further object of the invention resides in the provision of a rotary mower blade which, due to its arcuate cutting edges, tends to harmlessly sweep aside objects in its path instead of driving the same with great force which often endangers persons operating the mower, or in the immediate operating area.

Yet another object of the invention is that of providing a mower blade in which its cutting edges conform to its circular motion, and being smooth, present no projecting or irregular surfaces capable of ensnaring scraps of fabric or wire materials to become entangled in the blade, or shredded and cast out in small particles to litter the mowed area as often occurs when the conventional straight cutting blade is employed.

An important object of the invention resides in the provision of a rotary mower blade in which may be embodied baffles along portions thereof and between the opposing cutting edges to produce a centrifugal turbulence in the direction of rotation of the blade, aiding in discharging the severed grass, and other objects, from the blade housing.

Broadly, the invention contemplates the provision of a rotary mower blade which is substantially S-shaped, and mounted for rotation so that the curved portions of the blade are in the direction of rotation and the points thereof trail the said cutting edges, thus substantially minimizing the hazards usually attendant upon the action of conventional straight edged mower blades.

While the foregoing objects are paramount, other and lesser objects will become manifest as the description proceeds, taken in connection with the appended drawings wherein:

FIGURE 1 is a vertical sectional view of a lawn mower housing, on lines 1—1 of FIGURE 2, showing a rotary blade embodying the invention.

FIGURE 2 is an inverted fragmentary plan view of a mower illustrating the invention attached, the arrows indicating the direction of rotation.

FIGURE 3 is an enlarged perspective view of the blade embodying the invention, showing the curved cutting edges and the curved baffles.

FIGURE 4 is a modified form of curved blade which is adjustable and is shown attached to a circular disk, and FIGURE 5 is an edge view of the modified blade, on lines 5—5 of FIGURE 4.

In its preferred form the invention comprises a substantially S-shaped blade 10 having a generally straight body portion 11 having parallel front and back edges 12 and 13, and if desired, an enlarged central hub portion 14 in the center of which is an aperture 15 for an attaching stud 16.

The blade 10 has opposed curved cutting portions 17 and 18 which have sharp cutting knives 19 and 20 formed on the outer edges thereof and terminating in relatively sharp points 21 and 22, as shown in FIGURES 2 and 3.

Forming portions of the forward edges of the blade 10, and adjacent the cutting knives 19 and 20, are baffles 23 and 24 which project above the upper surface of the blade 10 and conform thereto in their curvature, facing in the direction of rotation of the blade 10. The baffles 23 and 24, being rounded, serve to push aside solid objects in the path of the blade 10, and to create a centrifugal cyclonic action in directing the severed grass toward the outlet 25 in the mower housing 26, as shown in FIGURES 1 and 2. The blade 10 is rotated in a clockwise direction as indicated by the arrows in FIGURE 2.

The mower illustrated in FIGURES 1 and 2 is of the conventional type and has a motor 27 whose shaft (not shown) is enclosed in a housing 28 projecting into the mower housing 26, and into the end of which the stud 16 is threaded, as illustrated in FIGURE 1. The wheels 29 are of conventional design and arrangement.

In FIGURES 4 and 5 is illustrated a modified embodiment of the invention which comprises a disk 30 of suitable diameter having a central aperture 31 therein for attachment to the motor shaft by the stud 16 in the same manner as the blade 10.

A pair of knives 32 and 33 are attached to opposing sides of the disk 30, each having an outwardly curved cutting edge 34, as shown in FIGURE 4, opposing an inwardly curved rear edge 35, the respective edges of each converging toward one end 36 which may be rounded, as shown in FIGURE 4, and pivotally secured to the disk 30 by a bolt 37. The wider ends 38 are right angular to the edges 34 and 35. The cutting edges 34 are substantially tangent to the perimeter of the disk 30, and are adjustable with respect thereto on their pivots 37 through the medium of slots 39 arranged in opposing edges of the disk 30 and bolts 40 arranged therethrough and through the knives 32.

On opposing sides of the disk 30, intermediate the knives 32, are angular cut-outs 41 which are turned upwardly providing triangular impeller members 42 whose angular surfaces are opposed to the direction of rotation of the disk 30. The impellers 42 serve to impart centrifugal action to the severed vegetation and direct the same through the outlet 25 in the mower housing 26 which is also the function of the baffles 23 and 24 of the blade 10.

Both of the structures shown in FIGURES 1, 2 and 3, and in FIGURES 4 and 5 have the same general function with essentially the same result. Both present curved cutting edges to the vegetation in a slicing action not attainable by the straight blade commonly employed, and both provide for the centrifugal fanning action to expedite the delivery of the severed vegetation through the discharge outlet 25 of the mower housing 26.

Each of the structures also provide for the sweeping action required to avoid a direct impact against solid objects which may lie in the path of the blades. The arcuate edges of the blades serve to push aside any hard objects encountered thereby without damaging the blades and without imparting a driving force to such objects which could result in damage to person or property.

The invention, though simple in design, is capable of certain changes and modifications as may fall within the spirit and intent thereof without departing from the scope of the appended claims.

What is claimed is:

1. In a cutter for lawn mowers, a blade adapted to rotation in a horizontal plane and having a substantially straight body portion and a circular hub portion intermediate its ends, a cutting element formed on each end of said body portion, tapered toward its outer end, and curved toward opposite edges of said body portion opposite the direction of rotation of said blade, a knife formed along the outer edge of each of said cutting elements along a portion of the tapered outer end thereof, and an upturned baffle element formed adjacent to each of said knives and extending along a portion of each opposing leading edge of said body portion toward the hub portion thereof.

2. In a cutter for rotary type lawn mowers, a blade adapted to be rotated in a horizontal plane and having a substantially straight body portion and an enlarged hub portion, tapered cutting elements formed at each end of said body portion and curved outwardly from opposite edges of said body portion and opposite to the direction of rotation of said blade, a knife formed along a portion of the curved outer edge of each cutting element, and an upturned baffle formed adjacent to each of the said knives and extending along a portion of the leading edge of said body portion toward the hub portion thereof.

References Cited in the file of this patent

UNITED STATES PATENTS

| | | |
|---|---|---|
| 2,517,405 | Moss | Aug. 1, 1950 |
| 2,836,029 | Johnson | May 27, 1958 |
| 2,902,814 | Lewis et al. | Sept. 8, 1959 |